(12) United States Patent
Toner

(10) Patent No.: US 7,805,401 B2
(45) Date of Patent: Sep. 28, 2010

(54) METHOD AND APPARATUS FOR SPLITTING A REPLICATED VOLUME

(75) Inventor: Stephen G. Toner, Sundance, UT (US)

(73) Assignee: Novell, Inc., Provo, UT (US)

( * ) Notice: Subject to any disclaimer, the term of this patent is extended or adjusted under 35 U.S.C. 154(b) by 253 days.

(21) Appl. No.: 11/555,105

(22) Filed: Oct. 31, 2006

(65) Prior Publication Data

US 2009/0119344 A9    May 7, 2009

Related U.S. Application Data

(63) Continuation-in-part of application No. 10/413,957, filed on Apr. 14, 2003, now Pat. No. 7,281,014.

(51) Int. Cl.
  *G06F 17/00* (2006.01)
(52) U.S. Cl. .................. 707/610; 707/609; 707/782; 707/802; 711/162
(58) Field of Classification Search ............ None
  See application file for complete search history.

(56) References Cited

U.S. PATENT DOCUMENTS

| | | |
|---|---|---|
| 4,467,421 A | 8/1984 | White |
| 4,601,012 A | 7/1986 | Aiken, Jr. |
| 4,853,843 A | 8/1989 | Ecklund |
| 5,060,185 A | 10/1991 | Naito et al. |
| 5,276,867 A | 1/1994 | Kenley et al. |
| 5,367,698 A | 11/1994 | Webber et al. |
| 5,423,018 A | 6/1995 | Dang et al. |
| 5,537,585 A | 7/1996 | Blickenstaff et al. |
| 5,555,371 A | 9/1996 | Duyanovich et al. |
| 5,671,350 A | 9/1997 | Wood |
| 5,812,748 A | 9/1998 | Ohran et al. |
| 5,832,274 A | 11/1998 | Cutler et al. |
| 5,832,487 A * | 11/1998 | Olds et al. ................ 707/10 |
| 5,875,479 A | 2/1999 | Blount et al. |

(Continued)

FOREIGN PATENT DOCUMENTS

EP    0921466    12/2002

OTHER PUBLICATIONS

Zayas, Edward R. "AFS-3 Programmer's Reference: Architectural Overview", Version 1.0 of 2, Sep. 1991, FS-00-D160, p. 14.

(Continued)

*Primary Examiner*—Tim T. Vo
*Assistant Examiner*—Michelle Owyang
(74) *Attorney, Agent, or Firm*—Marger Johnson & McCollom, P.C.

(57) ABSTRACT

At least two replicated instances of a source volume are split while allowing clients to access data moved during the split. Clients are redirected to the first replicated instance of the source volume. The first replicated instance is split by first moving files in a split path from the first replicated instance to the target volume. Then, after the files in the split path have been successfully moved to the target volume, a junction is inserted at the split directory to redirect clients to the target volume. After the first replicated instance is split, a second junction replaces the split path on the replicated instance of the first replicated instance.

23 Claims, 10 Drawing Sheets

U.S. PATENT DOCUMENTS

| | | | |
|---|---|---|---|
| 5,956,718 A * | 9/1999 | Prasad et al. | 707/10 |
| 5,960,194 A * | 9/1999 | Choy et al. | 1/1 |
| 5,991,771 A * | 11/1999 | Falls et al. | 707/202 |
| 6,061,770 A | 5/2000 | Franklin | |
| 6,101,585 A | 8/2000 | Brown et al. | |
| 6,105,062 A * | 8/2000 | Andrews et al. | 709/223 |
| 6,408,298 B1 * | 6/2002 | Van et al. | 707/10 |
| 6,457,011 B1 * | 9/2002 | Brace et al. | 707/10 |
| 6,647,393 B1 * | 11/2003 | Dietterich et al. | 707/102 |
| 6,678,700 B1 * | 1/2004 | Moore et al. | 707/200 |
| 6,898,609 B2 * | 5/2005 | Kerwin | 707/203 |
| 6,925,541 B2 * | 8/2005 | Yamagami | 711/162 |
| 6,931,410 B2 * | 8/2005 | Anderson et al. | 1/1 |
| 6,934,723 B2 * | 8/2005 | Breiter et al. | 707/204 |
| 6,944,621 B1 | 9/2005 | Collart | |
| 6,957,221 B1 * | 10/2005 | Hart et al. | 1/1 |
| 7,032,003 B1 * | 4/2006 | Shi et al. | 709/203 |
| 7,054,910 B1 * | 5/2006 | Nordin et al. | 709/208 |
| 7,080,102 B2 * | 7/2006 | O'Connell et al. | 707/202 |
| 7,191,298 B2 * | 3/2007 | Kaminsky et al. | 711/162 |
| 7,290,017 B1 * | 10/2007 | Wang et al. | 1/1 |
| 7,310,644 B2 * | 12/2007 | Adya et al. | 707/100 |
| 7,349,913 B2 * | 3/2008 | Clark et al. | 707/101 |
| 7,370,025 B1 * | 5/2008 | Pandit | 707/1 |
| 7,389,393 B1 * | 6/2008 | Karr et al. | 711/156 |
| 7,475,199 B1 * | 1/2009 | Bobbitt et al. | 711/154 |
| 2002/0049718 A1 | 4/2002 | Kleiman et al. | |
| 2003/0028737 A1 | 2/2003 | Kaiya et al. | |
| 2004/0205088 A1 * | 10/2004 | Toner | 707/200 |
| 2006/0136443 A1 * | 6/2006 | Dulay et al. | 707/101 |
| 2007/0192551 A1 * | 8/2007 | Hara et al. | 711/162 |

OTHER PUBLICATIONS

Campbell, Richard "Managing AFS, The Andrew File System" Prentice Hall, PTR Upper Saddle River, New Jersey 07458, http://www.phptr.com, 1998, pp. 103-106.

Cordrey, et al., "Moving Large Filesystems On-Line, Including Exiting HSM Filesystems," 1999 Lisa XIII, Seattle, WA, Nov. 7-12, 1999.

* cited by examiner

145

| DFS GUID | Location |
|---|---|
| 17C2 | First Replicated Instance 125 on Computer 105 |
| 17C2 | Second Replicated Instance 135 on Computer 110 |
| 334D | Target Volume 130 on Computer 105 |

FIG. 3

| DFS GUID | Location |
|---|---|
| 17C2 | First Replicated Instance 125 on Computer 105 |
| 17C2 | Second Replicated Instance 135 on Computer 110 |
| 334D | Target Volume 130 on Computer 105 |
| 3E1A | First Replicated Instance 125 on Computer 105 |

FIG. 5

METHOD AND APPARATUS FOR SPLITTING A REPLICATED VOLUME

RELATED APPLICATION DATA

This application is a continuation-in-part of, commonly assigned, U.S. patent application Ser. No. 10/413,957, titled "METHOD AND APPARATUS FOR MOVING DATA BETWEEN STORAGE DEVICES," filed Apr. 14, 2003 by the same inventor, and issued on Oct. 9, 2007 as U.S. Pat. No. 7,281,014.

FIELD OF THE INVENTION

This invention relates to moving data between storage devices in a computer system, and more particularly to moving data on a replicated storage device.

BACKGROUND OF THE INVENTION

Today's networked environment enables data storage to span multiple data volumes and multiple computers. A distributed file system (DFS) is one where multiple file systems, each residing on a different storage volume, are connected to one another. The different storage volumes can be included in the same computer or in different computers connected together using a network. The file systems on the different storage volumes could have once been part of a single file system on a single storage volume. For example, when an organization is just starting out, the data storage requirements for that organization might be modest, and the organization is able to store all data on a single volume. After a while, as the organization grows, the original volume reaches its maximum storage capacity. Instead of simply starting a new volume from scratch, the organization may wish to divide the volume, moving a subdirectory tree from the volume to the new volume, while appearing to the client as though only a single volume is in use.

While splitting a volume makes it easy for organization members to access data as they have always done, performing the volume split can be inconvenient for the organization members. As data is being moved to a new location, that data must first be taken off-line and made unavailable to users to prevent inconsistencies in the data.

In addition to using DFS to manage data storage, a system administrator can also use volume replication to replicate one or more of the volumes. Volume replication allows a file system that is on one volume to be copied and made available to clients on one or more other volumes; each volume is typically called a replicated instance of the volume. Volume replication has several advantages. One advantage is that one replicated instance can act as a data backup in the event that another replicated instance of the same volume goes down. Another advantage of volume replication is that data can be moved closer to where the user needs it, thus potentially providing performance improvements in accessing and downloading the data.

Using DFS in conjunction with volume replication introduces new complications to splitting a replicated volume. When splitting a replicated volume, each replicated instance of the volume must be taken off-line before moving the desired subdirectory tree to the new volume. Taking each replicated instance off-line removes some the advantages that volume replication specifically provides. With each replicated instance off-line, the volume is not available.

Another approach might be to take each volume off-line only as the volume split is being performed at each volume. This approach has the advantage that users can access data on one of the volumes: either the primary volume or the replicated instance of the primary volume. But if a replication method is used where there is a lag time between volume synchronization, then there is a possibility that the volume instances will have inconsistent data after the volume split occurs.

Accordingly, a need exists for a technique to split a replicated volume, while maintaining user access to the files being moved.

SUMMARY OF THE INVENTION

At least two replicated instances of a source volume are split while allowing clients to access data moved during the split. Clients are redirected to the first replicated instance of the source volume. The first replicated instance is split by first moving files in a split path from the first replicated instance to the target volume. Then, after the files in the split path have been successfully moved to the target volume, a junction is inserted at the split directory to redirect clients to the target volume. After the first replicated instance is split, a second junction replaces the split path on the replicated instance of the first replicated instance.

The foregoing and other features, objects, and advantages of the invention will become more readily apparent from the following detailed description, which proceeds with ten references to the accompanying drawings.

BRIEF DESCRIPTION OF THE DRAWINGS

FIG. 3 shows entries of the volumes shown in FIG. 1 in the volume location database (VLDB).

FIG. 5 shows the temporary DFS GUID of FIG. 4 added to the VLDB.

DETAILED DESCRIPTION OF THE PREFERRED EMBODIMENT

U.S. patent application Ser. No. 10/413,957, titled "METHOD AND APPARATUS FOR MOVING DATA BETWEEN STORAGE DEVICES," (herein referred to as "the Moving Data application"), filed Apr. 14, 2003 by the same inventor, and hereby incorporated by reference, describes a means for splitting data off one volume and moving it to another storage volume, while allowing clients to access the data on the storage volume during the move. The technique described in the Moving Data application applies when there is a single instance of the source volume. When there are replicated instances of the volume, then changes made to a copy of a file on a replicated instance might not be reflected in the files on the new volume after the volume is split. U.S. patent application Ser. No. 10/283,960, title "AN APPARATUS FOR POLICY BASED STORAGE OF FILE DATA AND META-DATA CHANGES OVER TIME", filed Oct. 29, 2002, now pending and incorporated by reference herein, describes a system and method for managing events.

Figure 1:
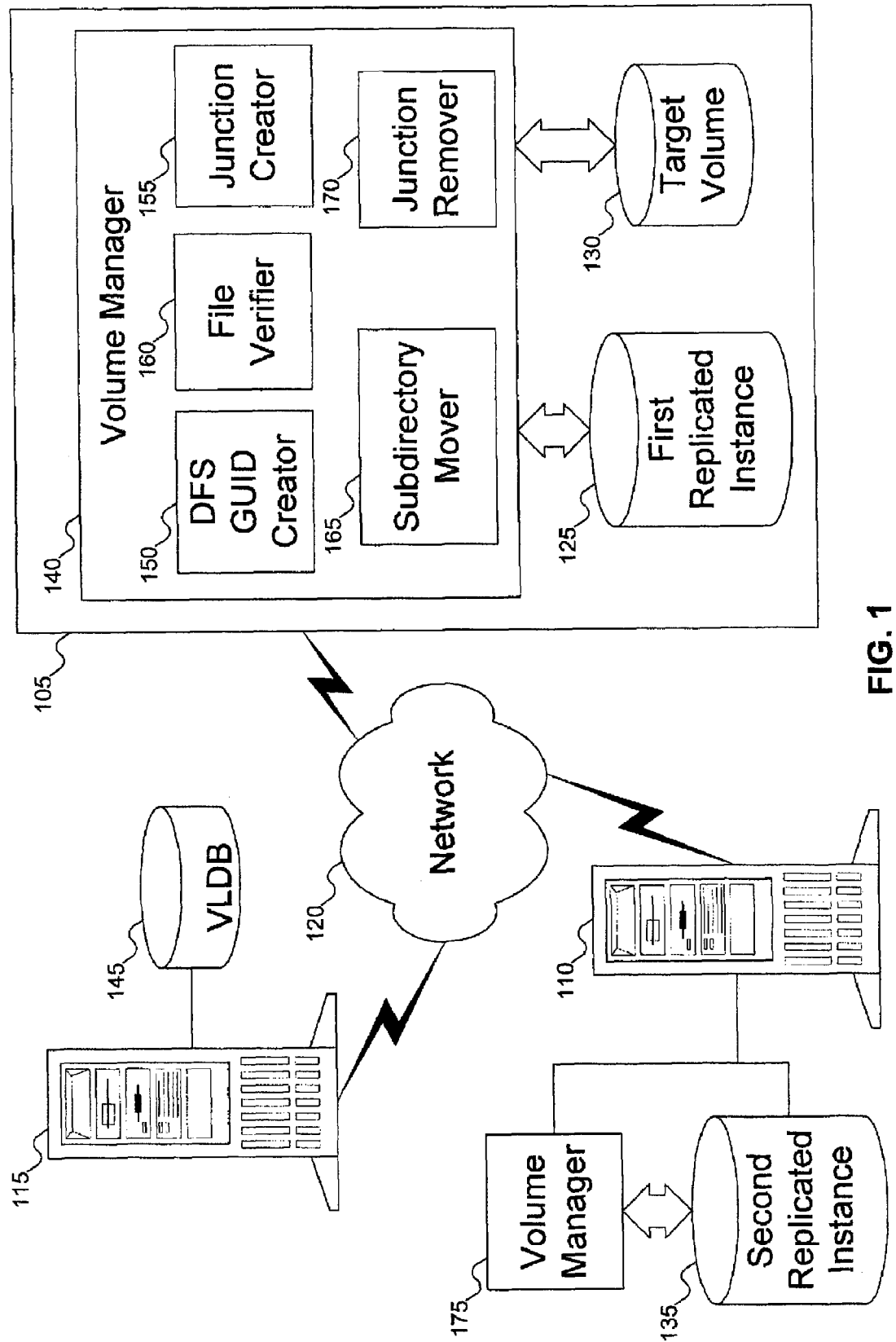
FIG. 1 shows a computer system configured to split a replicated volume while allowing clients to access the files that are moved from the volume, according to an embodiment of the invention.

FIG. 1 shows a computer system configured to split a replicated volume while allowing clients to access the files that are moved from the volume, according to an embodiment of the invention. Computer 105, computer 110, and computer 115 connect to one another using network 120. Computers 105, 110, and 115 can be servers or other machines to store and process data. Computers 105, 110, and 115 typically include a processor, memory such as random access memory (RAM), read-only memory (ROM), or other state preserving media, storages devices, and input/output interface ports not shown in FIG. 1. Note that although FIG. 1 shows three computers, a person skilled in the art will recognize that any number of computers can be used.

FIG. 1 shows two instances of a replicated volume. Any number of replicated instances can be used. Computer 105 includes first replicated instance 125 and target volume 130. Computer 110 includes second replicated instance 135. In an embodiment of the invention, first replicated instance 125 and second replicated instance 135 are replicated instances of the same volume. First replicated instance 125 and second replicated instance 135 include file systems that are accessed by client computers across network 120. The volumes are stored on storage media and can span multiple physical storage devices if needed (for example, a storage area network (SAN)).

Not shown in FIG. 1 are client computers that interact with computers 105, 110, and 115. Client computers can include desktop computer systems, including a computer, monitor, keyboard, and mouse. A person skilled in the art will recognize that client computers can take other forms, such as, among others, dumb terminals, Internet appliances, or handheld computing devices such as personal digital assistants (PDAs).

In an embodiment of the invention, because first replicated instance 125 and second replicated instance 135 contain copies of the same files, client computers can access either one of computer 105 or computer 110. Considerations by the client computer as to which computer to connect to are addressed below with reference to FIG. 2.

Client computers connect to computers 105, 110 and 115 across network 120. Network 120 can be any variety of network including, among others, a local area network (LAN), a wide area network (WAN), a global network (such as the Internet), and a wireless network (for example, using Bluetooth or any of the IEEE 802.11 standards).

In an embodiment of the invention, a volume is split when some files are moved from the volume to a new volume while other files are retained at the original volume. Typically the files in a directory or subdirectory on the original volume are moved to the new volume. A split directory refers to the directory or subdirectory identifying where the volume split occurs. The files and directories nested in the split directory make up a subdirectory tree referred to as a split path. Directories and files that are not in the split path remain on the original volume after the volume split.

During the split operation, client computers can access files on the replicated volume, including files being moved to the new volume. Clients are able to perform all of the normal file system activities, including but not limited to creating, deleting, renaming, and modifying files. Building an apparatus that allows a system administrator to move data while at the same time permitting users to access the same data has inherent challenges. Some files might be open for writing by users and, as a result, possibly incapable of being accessed. Also, because users are able to modify file system data after a file is moved, those changes need to be logged to insure that they are accurately reflected on the destination volume. During the volume split a list of logged files is maintained so that the new volume can be updated with the modified files.

FIG. 1 shows target volume 130 included in computer 105. Target volume 130 is the destination volume for data moved from the replicated volume as first replicated instance 125 is split. Although target volume 130 is shown as being part of computer 105, a person skilled in the art will recognize that target volume 130 can be included in another computer connected to computer 105 over network 120. In addition, target volume 130 can itself be replicated with any number of instances. If target volume 130 is replicated, the replication level and location of the replicated instances are specified when target volume 130 is created. This makes no difference to the split operation, as target volume 130 represents the instance where the files are moved.

Not shown in FIG. 1 is a replication manager responsible for maintaining consistency between replicated instances of a volume, such as first replicated instance 125 and second replicated instance 135. Also, if target volume 130 is replicated, the replication manager is responsible for keeping the other instances of target volume 130 in sync.

In an embodiment of the invention, computer 105 includes volume manager 140. Volume manager 140 performs the volume split of first replicated instance 125. For example, a system administrator can send a request to volume manager 140 identifying a split path on first replicated instance 125 to be moved to target volume 130. The Moving Data application describes how volume manager 140 can split first replicated instance 125 while allowing clients to access the moved file during the volume split. In addition, computer 110 includes volume manager 175 that can split second replicated instance 135.

Volume manager 140 and volume manager 175 interface with volume location database (VLDB) 145 stored on computer 115. In an embodiment of the invention, VLDB 145 associates volume names with a distributed file system (DFS) globally unique identifier (GUID) and the physical location of the volumes. VLDB 145 is accessible from most of the computers in the network. A client computer can access a particular volume instance by looking up the volume in VLDB 145 to resolve the physical location of the volume. VLDB 145 is described in greater detail below with reference to FIGS. 3 and 5.

In an embodiment of the invention, clients seeking access to files in the split path of second replicated instance 135 are redirected to first replicated instance 125 as first replicated instance 125 is being split. If there are additional replicated instances of the volume, the split paths of these instances are also redirected to first replicated instance 125. In an embodiment of the invention, a junction identifying first replicated instance 125 is inserted in the split path of second replicated instance 135. The use of a junction is discussed in greater detail below with reference to FIG. 6. In another embodiment, a symbolic link is used to redirect clients.

Volume manager 140 includes DFS GUID creator 150, junction creator 155, and file verifier 160 to insert a junction to redirect client access to files on the split path of second replicated instance 135. Although not shown in FIG. 1, volume manager 175 also includes these elements. DFS GUID creator 150 creates a temporary DFS GUID to assign to first replicated instance 125. In creating a temporary DFS GUID, DFS GUID creator 150 looks for a unique identifier to be assigned to first replicated instance 125. Then, if a client identifies a junction with the temporary DFS GUID, the client can look up the temporary DFS GUID in VLDB #145 and identify first replicated instance 125 as the appropriate volume for redirection. If temporary DFS GUID is not unique, then the client might redirect to another volume in error.

After DFS GUID creator 150 assigns a temporary DFS GUID to first replicated instance 125, junction creator 155 inserts a temporary junction at the split directory of second replicated instance 135. A junction acts as a "link" between volumes, connecting two volumes using a DFS GUID in the junction to point from one volume to another volume. When encountering a junction, the client represents the junction as a subdirectory to the end user. In an embodiment of the invention, the inserted junction includes the temporary DFS GUID that is assigned to first replicated instance 125. As the client encounters the junction on second replicated instance 135, the client looks up the temporary DFS GUID in VLDB 145 to identify the name and location of the volume assigned that DFS GUID. Inserting a junction with the temporary DFS GUID at the split directory of second replicated instance 135 in effect takes the split path of second replicated instance 135 off-line. Note that as the junction is in the split path of second replicated instance 135, the benefits of volume replication are temporarily suspended for the files in the split path, with only first replicated instance 125 accessible for those files. Finally, when inserting the junction with the temporary DFS GUID at the split path of a replicated instance other than the instance where the volume split occurs, volume manager 140 notifies the replication manager to not replicate the temporary junction.

In an embodiment of the invention, file verifier 160 verifies that each file copy in the split path of second replicated instance 135 is closed. File verifier 160 is discussed in greater detail below with reference to FIG. 6. Once file verifier 160 verifies that all files in the split path are closed, first replicated instance 125 is temporarily the sole volume available for client access for files in the split path. Volume manager 140 then splits first replicated instance 125. In an embodiment of the invention, subdirectory mover 165 performs the split of first replicated instance 125 while clients can access and modify files on first replicated instance 125.

After volume manager 140 has successfully split first replicated instance 125, junction remover 170 removes the temporary junction from second replicated instance 135. Volume manager 140 then inserts a junction at the split directory of second replicated instance and deletes the file copies in the split path. This embodiment has as an advantage that volume manager 140 knows when the volume split is successful and can insert the new junction on the replicated instances immediately.

In an embodiment of the invention, volume split of second replicated instance 135 is performed during the normal process of replication. Using the standard replication process might take more time than using volume manager 140. However, if time is not a big concern, then it makes sense to utilize the replication process that is already in place. Second replicated instance 135 (and other replicated instances with the temporary junction, continue to operate fine, but with an extra level of delay. This step replaces the temporary junctions with junctions that point directly to the target volume.

Finally, although FIG. 1 shows DFS GUID creator 150, file verifier 160, subdirectory mover 165, junction creator 155, and junction remover 170 as being included in volume manager 140, in another embodiment, each of the modules interact with volume manager 140, while being distinct from the volume manager. In addition, these modules can each reside on a different computer from the computer with volume manager 140 and connect to the volume manager over network 120.

Figure 2:
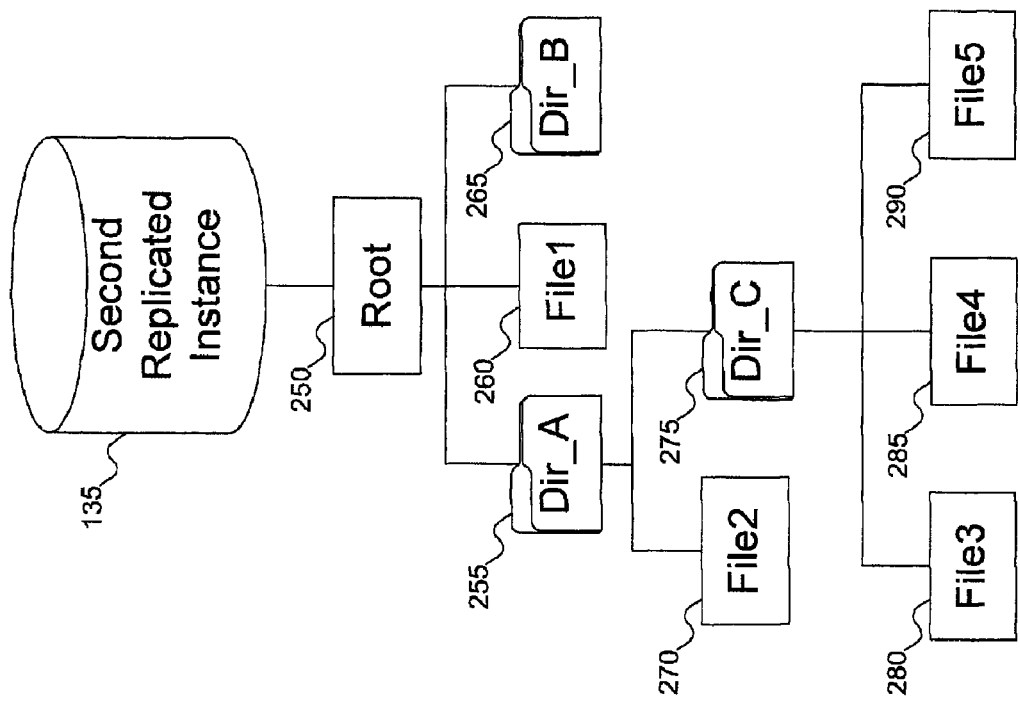
FIG. 2 shows a file system contained on the first replicated instance and the corresponding file system copy on the second replicated instance shown in FIG. 1.
Figure 2:
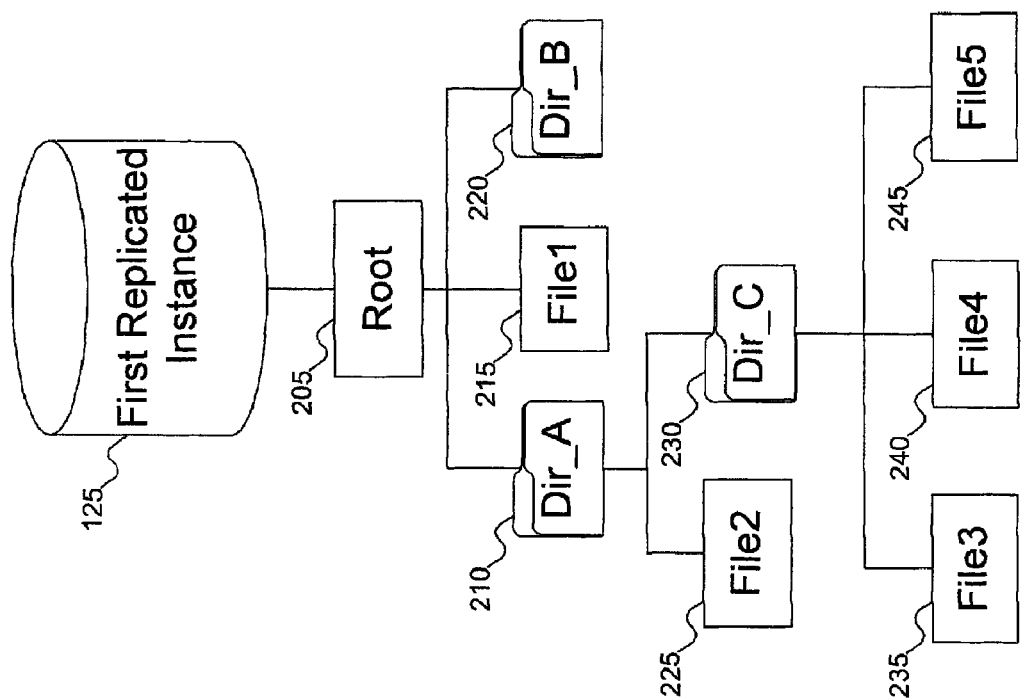

FIG. 2 shows a file system contained on the first replicated instance and the corresponding file system copy on the second replicated instance shown in FIG. 1. First replicated instance 125 includes root directory 205. At the root level are directory 210 "Dir_A", file 215 "File1", and directory 220 "Dir_B". Directory 210 stores file 225 "File2" and directory 230 "Dir_C". Directory 230, in turn, stores three files: file 235 "File3", file 240 "File4" and file 245 "File5".

Second replicated instance 135 includes a copy of the directory tree on first replicated instance 125. Second replicated instance 135 includes root directory 250. Like root directory 205 on first replicated instance 125, root directory 250 stores three entries: directory copy 255 is a copy of "Dir_A", file copy 260 is a copy of "File1", and directory copy 265 is a copy of "Dir_B". In turn, directory copy 255 stores file copy 270 and directory copy 275. Finally, directory copy 275 stores file copy 280 "File3", file copy 285 "File4", and file copy 290 "File5".

In FIG. 2, the directory tree and directory tree copy are in sync with each other. At other instances in time, a client can be updating data on either first replicated instance 125 or second replicated instance 135. For example, suppose a new file is created in the directory copy 265. Immediately upon creation, that file might only exist on second replicated instance 135. However, the replication process ensures that a copy of the new file is also added to corresponding directory 220 on first replicated instance 125. The replication process also handles other file events, such as a move, delete, or modification of a file.

In an embodiment of the invention, second replicated instance 135 can be used to provide backup to first replicated instance 125. In this embodiment, a client might access files in the directory tree on first replicated instance 125 if that volume is available. But if computer 105, storing first replicated instance 125, is shut down or otherwise unavailable, then the client can access the file copies on second replicated instance 135.

In another embodiment of the invention, second replicated instance 135 is used to provide data storage at a particular location. Consider an organization with an office in Utah and an office in Massachusetts, and volumes in computers at the two different locations. The users in Utah might access data on the replicated instance in Utah, while the users in Massachusetts might access data on the geographically closer replicated instance of the volume. In an embodiment of the invention, client computers can be configured to connect to a preferred replication instance, such as one that is geographically close to the client. By enabling users to access data on a volume close to the user, time spent accessing and downloading the data can be improved. After the user has made changes to the data, then the replication process ensures that the data on the one volume is synchronized with the data on the other volume, with little inconvenience to the user.

In yet another embodiment of the invention, the client can select a replicated instance by pinging the different servers with the replicated instances. The server that responds to the ping in the least amount of time is a good candidate for client selection. A person skilled in the art will recognize that there are other ways a client can select a replicated instance of a volume to access.

FIG. 3 shows entries of the volumes shown in FIG. 1 in the volume location database (VLDB). VLDB 145 stores DFS GUIDs along with corresponding volume names and locations. For example, entry 305 shows that first replicated instance 125 on computer 105 of FIG. 1 is assigned a DFS GUID of "17C2". Entry 310 shows that the same DFS GUID is also assigned to second replicated instance 135 on computer 110. In an embodiment of the invention, when a client requests access to a volume with the DFS GUID of "17C2", VLDB 145 returns both first replicated instance 125 on computer 105 and second replicated instance 135 on computer 110. The client then selects one of the returned volumes. The client might select the volume that is closest to the client, or the client might select a volume by nature of it being the primary volume as described above. The client can also select a volume arbitrarily or based on other considerations.

In another embodiment of the invention, VLDB 145 returns a single volume location for the client using considerations similar to those considered by a client selecting a volume. In addition, VLDB 145 can also return a volume location based on load considerations using information about how many clients are currently accessing a particular instance of a volume.

Although target volume 130 initially stores no data, target volume 130 can still be assigned a DFS GUID. Entry 315 shows that a DFS GUID is assigned to target volume 130 on computer 105. After the volume split is successful (i.e., all data has been copied to target volume 130), a junction pointing to DFS GUID "334D" at target volume 130 on computer 105 can be inserted on first replicated instance 125. As other volumes are added to the network, these additional volumes can also be assigned DFS GUID and stored in VLDB 145. For example, if target volume 130 is replicated, then an entry of the assignment of DFS GUID "334D" to the replicated instance of the target volume would be added to VLDB 145.

Each entry in VLDB 145 provides enough details for the client to access the particular volume of interest to the client. In other situations, more or less location information might be provided. For example, if there is only one volume per computer, then a client might be able to access a volume simply by knowing the computer name. Or each volume could have a unique name making identification and location simple based on the name.

Figure 4:
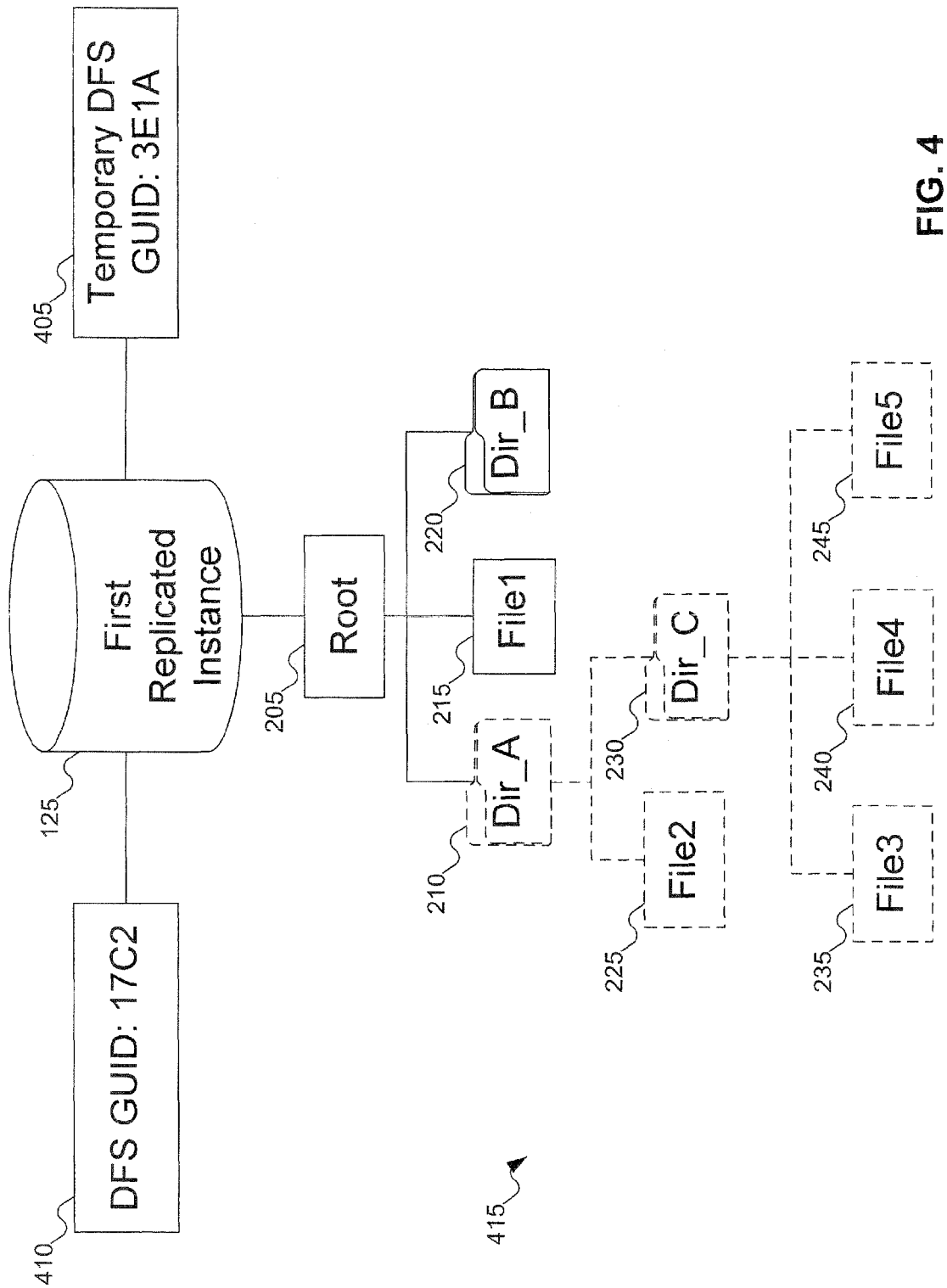
FIG. 4 shows the first replicated instance of FIG. 1 before the files in the split path are moved to the target volume.

FIG. 4 shows the first replicated instance of FIG. 1 before the files in the split path are moved to the target volume. In an embodiment of the invention, before splitting first replicated instance 125, clients accessing data in split path 415 on other replicated instances (such as second replicated instance 135) are redirected to the split directory on first replicated instance 125. In an embodiment of the invention, to minimize the inconvenience to clients as well as preserve data integrity, temporary DFS GUID 405 "3E1A" is assigned to first replicated instance 125. Note that DFS GUID 410 "17C2" remains assigned to first replicated instance 125. In another embodiment of the invention, a symbolic link or other method can be used to redirect clients from other replicated instances to first replicated instance 125.

Directories and files in split path 415 are shown with dotted lines. The files in split path 415 are directory 210 "Dir_A", file 225 "File2", directory 230 "Dir_C", file 235 "File3", file 240 "File4", and file 245 "File5". In addition, directory 210 is the split directory as it is the root directory of split path 415.

FIG. 5 shows the temporary DFS GUID of FIG. 4 added to the VLDB. After volume manager 140 assigns temporary DFS GUID 405 of FIG. 10 to first replicated instance 125, entry 505 is added to VLDB 145. Entry 505 shows that DFS GUID "3E1A" has been assigned to first replicated instance 125 on computer 105. By creating entry 505 with the assignment of temporary DFS GUID 405 to first replicated instance 125 on computer 105, it is possible to temporarily redirect clients attempting to access second replicated instance 135 to first replicated instance 125.

For example, if VLDB 145 receives a request for a volume with a DFS GUID of "17C2", VLDB 145 identifies two volumes that are assigned to that DFS GUID: first replicated instance 125 and second replicated instance 135. As discussed above with reference to FIG. 4, the client can then access one of these volumes. If the client selects first replicated instance 125 to access, the client accesses the volume as usual. If the client selects second replicated instance 135, then if the client accesses Dir_A, the client encounters the inserted junction and redirects the client to first replicated instance 125. Note that client access of files on second replicated instance 135 that are not in the Dir_A split path are handled without being redirected to first replicated instance 125.

Figure 6:
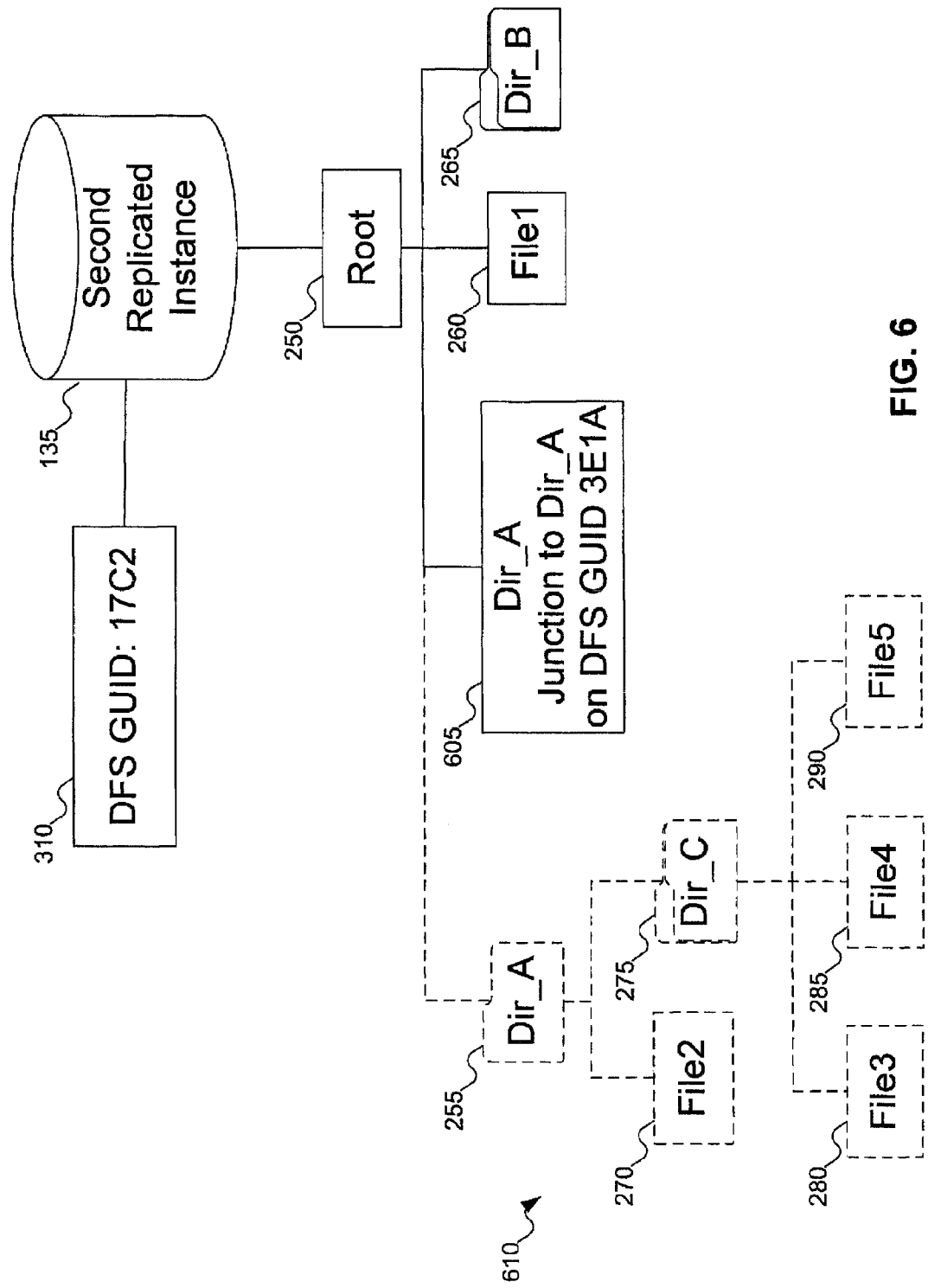
FIG. 6 shows a junction pointing to the split directory of the first replicated instance inserted at the split directory on the second replicated instance of FIG. 1.

FIG. 6 shows a junction pointing to the split directory of the first replicated instance inserted at the split directory on the second replicated instance of FIG. 1. In an embodiment of the invention, when a client accesses split directory "Dir_A" on second replicated instance 135, the client encounters junction 605. Junction 605 directs the client to Dir_A on the replicated instance that is assigned to the DFS GUID "3E1A". Because the DFS GUID "3E1A" is assigned to first replicated instance 125, clients access this volume instance.

After junction 605 is inserted at split directory 255, file verifier 160 verifies that each file in split path 610 is closed. If all files are closed when junction 605 is inserted on second replicated instance 135, then file verifier 160 can report this immediately. Recall that junction 605 serves to redirect clients to Dir_A on first replicated instance 125, thus copies of files that are closed when junction 605 is inserted remain closed until junction 605 is removed.

However, if any copies of files in split path 610 are open when junction 605 is inserted in the volume, file verifier 160 waits until the file copy is closed and then notifies volume manager 140 once all file copies are closed. For example, suppose file copy 270 "File2" and file copy 285 "File4" are open when junction 605 is added to the volume. Users could be simply accessing the file copies or making changes to the file copies. Once the user is finished accessing file copy 270, then file verifier 160 notices that the file copy is now closed. If the user tries to access the file copy again, junction 605 redirects the user to file 225 on first replicated instance 125 rather than allowing the user to access file copy 270 as done earlier.

Figure 7:
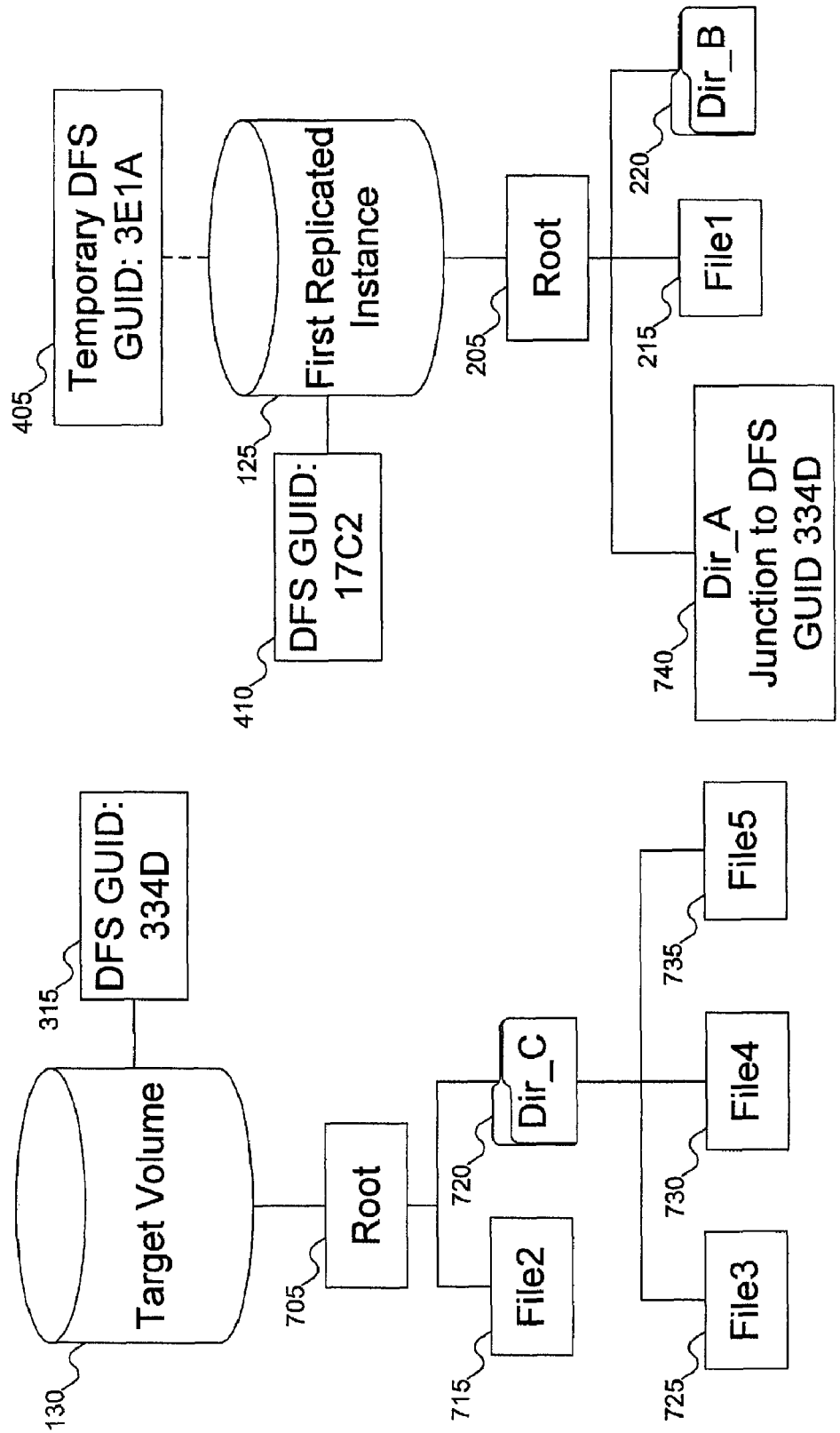
FIG. 7 shows the target volume and first replicated instance of FIG. 1 after the contents of the split path are moved from the first replicated instance to the target volume.

Once each file in split path 610 is closed, file verifier 160 notifies volume manager 140 that first replicated instance 125 can now be split. In an embodiment of the invention, first replicated instance 125 is split while permitting users to access the files on first replicated instance 125. The volume split can be performed as described in the Moving Data application. FIG. 7 shows the target volume and first replicated instance of FIG. 1 after the files in the split path are moved from the first replicated instance to the target volume. Target volume 130 now includes root directory 705 and the files in the split path: file 715 "File2", directory 720 "Dir_C", file 725 "File3", file 730 "File4", and file 735 "File5".

First replicated instance 125 no longer includes corresponding versions of the files from the split path. Instead, root directory 205 includes junction 740 named "Dir_A" (the split directory that was previously stored in root directory 205 of first replicated instance 125). In an embodiment of the invention, junction 740 appears to a client as if it is directory 210 "Dir_A" that had been stored in root directory 205. Junction 740 includes the DFS GUID "334D" identifying the location of the moved files. When a client sees junction 740 on first replicated instance 125, the client can look up the DFS GUID identified in the junction to determine that target volume 130 is assigned the appropriate DFS GUID.

A volume split is complete when all files in the split path are moved from first replicated instance 125 to target volume 130 and any changes occurring afterwards are reflected in the files on the target volume. In an embodiment of the invention, after volume manager 140 successfully performs the volume split, temporary DFS GUID 405 is unassigned from first replicated instance 125 (as indicated by the dashed line). Temporary DFS GUID 405 can then be removed from the VLDB, and the VLDB returns to containing the entries shown in FIG. 3.

Figure 8:
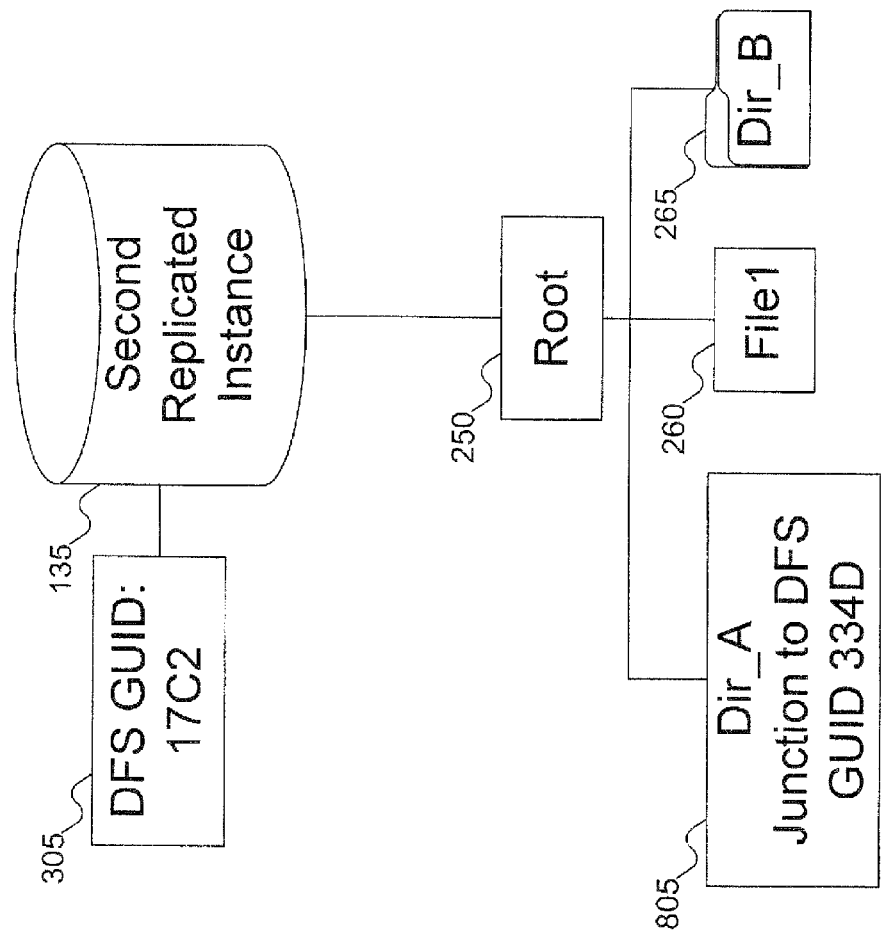
FIG. 8 shows the second replicated instance of FIG. 1 after the subdirectory tree is replaced with a junction to the target volume.

FIG. 8 shows the second replicated instance of FIG. 1 after the split directory is replaced with a junction to the target volume. Just as prior to the volume split, second replicated instance 135 includes root directory 250 storing file copy 260 "File1" and directory copy 265 "Dir_B". In addition, second replicated instance 135 also includes junction 805 (named "Dir_A") redirecting clients to target volume 130, and the file copies from the split path are removed from replicated instance of the first replicated instance. To users, junction 805 has the appearance of being Dir_A.

In an embodiment of the invention, volume manager 140 replaces the split directory with junction 805 after the split operation is successful. In another embodiment of the invention, the standard replication process synchronizes second replicated instance 135 with first replicated instance 125 according the standard replication process. For example, if it is important to have the volume split reflected in second replicated instance 135 as soon as possible (for maximum availability and to avoid the extra overhead of continuing to go through temporary junction 605), then volume manager 140 can create junction 805 immediately after the volume split of first replicated instance 125 is complete. If it is acceptable for a period of time to occur before the propagation, then the split can be replicated using standard replication techniques.

Figure 9A:
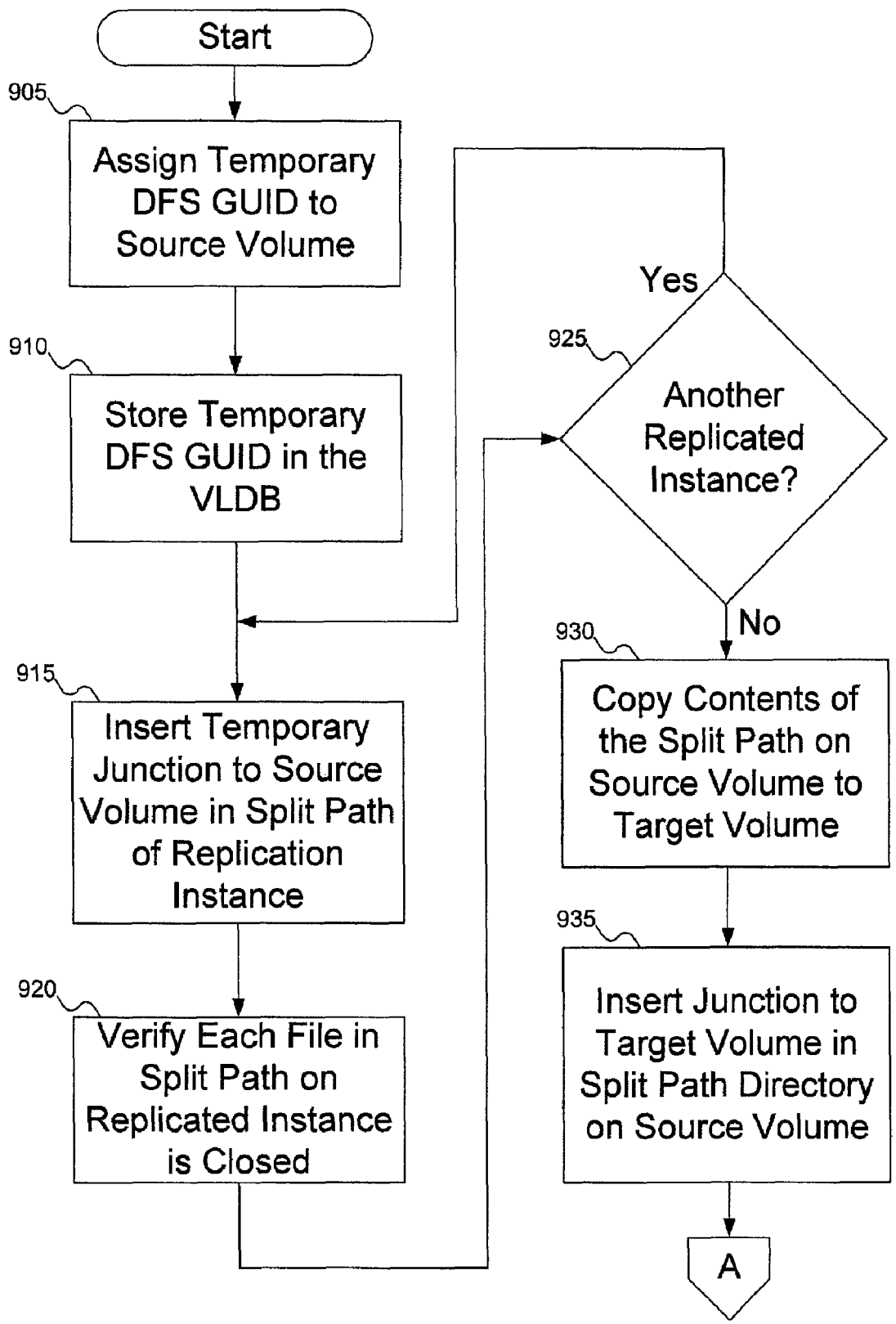
FIGS. 9A-9B show a flowchart of the process of splitting the replicated volume shown in FIG. 1.
Figure 9B:
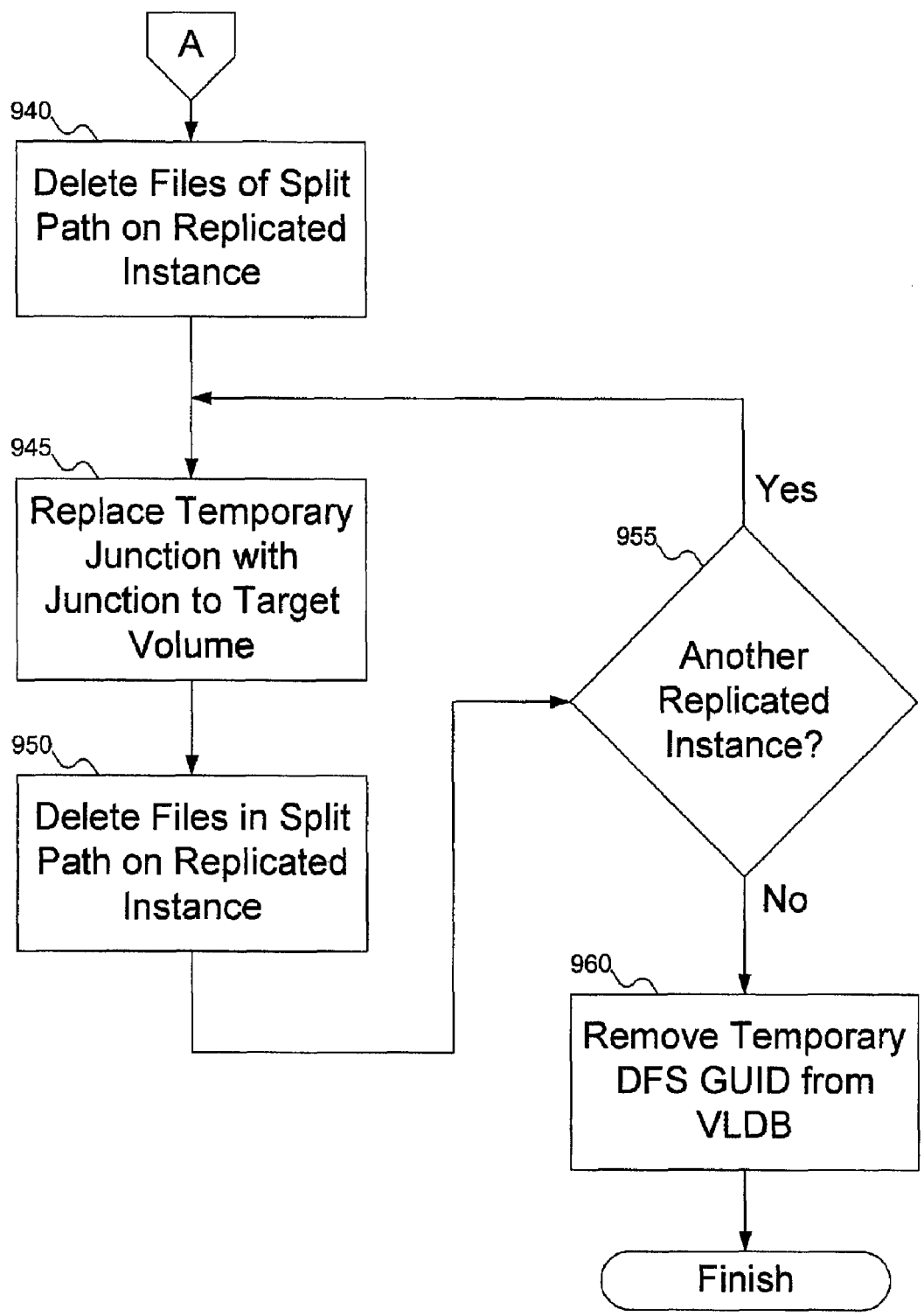

FIGS. 9A-9B show a flowchart of the process of splitting the replicated instances of the volume shown in FIG. 1. In this discussion, both source volume and replicated instance refer to replicated instances of the same volume. The source volume only differs from the other replicated instances in that the source volume is the particular replicated instance where the volume split occurs.

At step 905, the volume manager assigns a temporary DFS GUID to the source volume. At step 910, the volume manager stores the temporary DFS GUID in the VLDB with the location of the source volume including the location of the source volume. At step 915, the volume manager inserts a junction at the split directory on the replicated instance. As previously discussed with reference to FIG. 6, the junction is used to direct client requests for files in the split path in the replicated instance to the split path of the source volume, in effect taking the split path of the replicated instance off-line. In other words, while the volume split is in progress, the benefits of using replicated volumes are somewhat suspended, and client requests for files in the split path go to the source volume. However, client requests for files that are not in the split path stay at the replicated instance, maximally preserving the benefits of volume replication. But, by directing client requests for files in the split path to the single volume, the volume is able to be split while allowing clients to access the data on the volume. This is a benefit to users with a preference towards data access.

After the volume manager inserts the junction in the replicated instance, at step 920 the volume manager verifies that each file in the split path on the replicated instance is closed. Note that when the junction is inserted in the replicated instance of the source volume, it is possible that a client is in the process of accessing a file on the split path.

At decision block 925, if there is another replicated instance, then the process returns to steps 915 and 920. Once all replicated instances are temporarily redirected to the source volume (as indicated by step 915), and each file in the split path of the replicated instances are closed (as indicated by step 920), then the source volume can be split. Note that although FIG. 9 shows steps 915 and 920 occurring for a single volume instance at a time, in another embodiment of the invention, steps 915 and 920 are performed in parallel for each volume instance.

At step 930, the volume manager copies the files in the split path on the source volume to the target volume while allowing clients to access to the files. After the files in the split path are successfully moved from the source volume to the target volume, at step 935 the volume manager replaces the split directory with a junction to the target volume. In an embodiment of the invention, the junction includes the DFS GUID of the target volume. As a client computer requests a file in the split path, the client encounters the junction including the DFS GUID. The client then looks up the DFS GUID in the VLDB, and identifies the location of the target volume. Then the client connects to the target volume.

At step 940 (FIG. 9B), the volume manager deletes the moved subdirectory from the source volume. The deletion can be a background task that can be performed any time after the junction to the target volume is inserted on source volume. In an embodiment of the invention step 940 can also be performed in parallel with step 945. At step 945, the volume manager replaces the temporary junction to the source volume on the replicated instance with a junction to the target volume, and clients access the files on target volume.

At step 950, the files in the split path on the replicated instance are deleted. Note that although step 950 is shown as occurring after step 945, in an embodiment of the invention step 950 can occur any time after step 920. At decision block 955, if there are additional replicated instances of the volume, then the process returns to steps 945 and 950. In an embodiment of the invention, steps 945 and 950 can be performed at the same time for each replicated instance of the source volume.

In one embodiment of the invention, steps 945 and 950 are handled by the volume manager, which can insert a junction to the target volume and remove the copies of the moved files from the replicated instance(s) as soon as the volume split is completed on the source volume. This embodiment has as an advantage that the volume manager knows when the volume split is successful, and can propagate the split immediately.

In another embodiment of the invention, propagation of the volume split can be achieved by using the normal replication process. In this embodiment steps 945 and 950 are eliminated as the replication process handles the replacement of the temporary junction and the deletion of files. This embodiment does not require any further action by the volume manager, although using the normal replication process might mean that the propagation occurs on a replication schedule, and the split is not necessarily replicated immediately.

Finally, at step 960, the volume manager next removes the temporary DFS GUID from the VLDB. This step is performed after all other steps have completed successfully.

The following discussion is intended to provide a brief, general description of a suitable machine in which certain aspects of the invention may be implemented. Typically, the machine includes a system bus to which is attached processors, memory, e.g., random access memory (RAM), read-only memory (ROM), or other state preserving medium, storage devices, a video interface, and input/output interface ports. The machine may be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, or a system of communicatively coupled machines or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine may include embedded controllers, such as programmable or non-programmable logic devices or arrays, Application Specific Integrated Circuits, embedded computers, smart cards, and the like. The machine may utilize one or more connections to one or more remote machines, such as through a network interface, modem, or other communicative coupling. Machines may be interconnected by way of a physical and/or logical network, such as an intranet, the Internet, local area networks, wide area networks, etc. One skilled in the art will appreciate that network communication may utilize various wired and/or wireless short range or long range carriers and protocols, including radio frequency (RF), satellite, microwave, Institute of Electrical and Electronics Engineers (IEEE) 802.11, Bluetooth, optical, infrared, cable, laser, etc.

The invention may be described by reference to or in conjunction with associated data including functions, procedures, data structures, application programs, etc. which when accessed by a machine results in the machine performing tasks or defining abstract data types or low-level hardware contexts. Associated data may be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data may be delivered over transmission environments, including the physical and/or logical network, in the form of packets, serial data, parallel data, propagated signals, etc., and may be used in a compressed or encrypted format. Associated data may be used in a distributed environment, and stored locally and/or remotely for machine access.

Having described and illustrated the principles of the invention with reference to illustrated embodiments, it will be recognized that the illustrated embodiments may be modified in arrangement and detail without departing from such principles. And although the foregoing discussion has focused on particular embodiments and examples, other configurations are contemplated. In particular, even though expressions such as "according to an embodiment of the invention" or the like are used herein, these phrases are meant to generally reference embodiment possibilities, and are not intended to limit the invention to particular embodiment configurations. As used herein, these terms may reference the same or different embodiments that are combinable into other embodiments.

Consequently, in view of the wide variety of permutations to the embodiments described herein, this detailed description and accompanying material is intended to be illustrative only, and should not be taken as limiting the scope of the invention. What is claimed as the invention, therefore, is all such modifications as may come within the scope and spirit of the following claims and equivalents thereto.

The invention claimed is:

1. A system to move a subdirectory tree, comprising:
   a computer;
   a first replicated instance of a source volume;
   a directory tree on the first replicated instance of the source volume, the directory tree including a split path, the split path including a split directory;
   a second replicated instance of the source volume, the second replicated instance including a copy of the directory tree, the copy of the directory tree including a copy of the split path, the copy of the split path including a split directory;
   a target volume;
   a volume location database to store corresponding volume names and locations;
   a volume manager to redirect a client from the second replicated instance of the source volume to the first replicated instance of the source volume using the volume location database;
   a file verifier to verify that each file in the copy of the split path on the second replicated instance of the source volume is closed and to notify the volume manager when each file in the copy of the split path on the second replicated instance of the source volume is closed; and
   a subdirectory mover to move each file in the split path on the first replicated instance of the source volume to the target volume responsive to verification that each file in the copy of the split path on the second replicated instance of the source volume is closed while allowing the client to access each file in the split path on the first replicated instance of the source volume, wherein the volume manager is operative to insert a junction in the second replicated instance of the source volume pointing to the target volume after the subdirectory mover moves each file in the split path on the first replicated instance of the source volume to the target volume and to delete each file in the split path on the first replicated instance of the source volume.

2. The system according to claim 1, wherein the volume manager includes a junction creator to insert a temporary junction at the split directory on the second replicated instance of the source volume pointing to a temporary distributed file system globally unique identifier (DFS GUID) assigned to the first replicated instance of the source volume before the subdirectory mover moves each file in the split path on the first replicated instance of the source volume to the target volume.

3. The system according to claim 2, further comprising a DFS GUID creator to create the temporary DFS GUID assigned to the first replicated instance of the source volume.

4. The system according to claim 2, further comprising a junction remover to remove from the second replicated instance of the source volume the temporary junction pointing to the temporary DFS GUID assigned to the first replicated instance of the source volume.

5. The system according to claim 1, wherein the volume manager includes a junction creator to insert a first junction at the split directory on the first replicated instance of the source volume pointing to a DFS GUID assigned to the target volume.

6. The system according to claim 5, wherein the volume manager is operative to insert a second junction at the split directory on the second replicated instance of the source volume pointing to the DFS GUID assigned to the target volume and to delete each file in the copy of the split path on the second replicated instance of the source volume.

7. The system according to claim 6, further comprising a replication manager to propagate a copy of the second junction to the second replicated instance of the source volume at the split directory on the second replicated instance of the source volume and to replicate a deletion of each file in the copy of the split path on the second replicated instance of the source volume.

8. A computer-implemented method to move a subdirectory tree on a first replicated instance of a source volume to a target volume, comprising:
    assigning to the first replicated instance of the source volume a first distributed file system globally unique identifier (DFS GUID);
    inserting at a second replicated instance of the source volume a first junction pointing to the first DFS GUID;
    verifying each file in a split path on the second replicated instance of the source volume is closed including verifying that each file in the split path on the second replicated instance of the source volume is not being currently accessed by a user, wherein the split path includes a split directory;
    notifying a volume manager that each file in the split path on the second replicated instance of the source volume is closed;
    copying each file in a corresponding split path on the first replicated instance of the source volume to the target volume responsive to the notifying that each file in the split path on the second replicated instance of the source volume is closed;
    assigning to the target volume a second DFS GUID;
    inserting at the split directory on the first replicated instance of the source volume a second junction pointing to the second DFS GUID;
    deleting each file in the split path on the first replicated instance of the source volume;
    removing from the second replicated instance of the source volume the first junction pointing to the first DFS GUID assigned to the first replicated instance of the source volume; and
    updating the second replicated instance of the source volume.

9. The method according to claim 8, wherein updating the second replicated instance of the source volume includes:
    inserting at the split directory on the second replicated instance of the source volume a copy of the second junction to the second DFS GUID pointing to the target volume; and
    deleting each file in the split path on the second replicated instance of the source volume.

10. The method according to claim 8, wherein:
    assigning to the first replicated instance of the source volume a first DFS GUID includes storing an assignment of the first DFS GUID to the first replicated instance of the source volume in a volume locator database (VLDB); and
    assigning to the target volume a second DFS GUID includes storing an assignment of the second DFS GUID to the target volume in the VLDB.

11. The method according to claim 8 further comprising un-assigning the first DFS GUID from the first replicated instance of the source volume.

12. The method according to claim 11, wherein un-assigning the first DFS GUID from the first replicated instance of the source volume includes removing an assignment of the first DFS GUID to the first replicated instance of the source volume in a volume location database (VLDB).

13. A computer apparatus to move a subdirectory tree from a replicated storage volume to a target storage volume, comprising:
    a volume locator database (VLDB) to store a first entry including a first assignment of a first distributed file system globally unique identifier (DFS GUID) to a first replicated instance of a source storage volume, a second entry including a second assignment of the first DFS GUID to a second replicated instance of the source storage volume, and a third entry including a third assignment of a second DFS GUID to the target storage volume;
    a DFS GUID creator to create a fourth entry in the VLDB including a fourth assignment of a temporary DFS GUID to the first replicated instance of the source storage volume;
    a volume manager including a junction creator to insert a first junction at the second replicated instance of the source storage volume pointing to the temporary DFS GUID assigned to the first replicated instance of the source storage volume; and
    a file verifier to verify that each file in a split path on the second replicated instance of the source storage volume is closed and to notify the volume manager when each file in the split path on the second replicated instance of the source storage volume is closed.

14. The apparatus according to claim 13, further comprising a subdirectory mover to move each file in the split path on the first replicated instance of the source storage volume to the target storage volume while allowing a client to access a file in the split path of the first replicated instance of the source storage volume.

15. The apparatus according to claim 14, wherein the volume manager is operative to insert at a split directory on the first replicated instance of the source storage volume a second junction pointing to the second DFS GUID assigned to the target storage volume.

16. The apparatus according to claim 15, further comprising a junction remover to remove the first junction from the second replicated instance of the source storage volume.

17. The apparatus according to claim 15, wherein the volume manager is operative to insert at the split path on the second replicated instance of the source storage volume a third junction pointing to the second DFS GUID assigned to the target storage volume and to delete each file in the split path on the second replicated instance of the source storage volume.

18. The apparatus according to claim 15, further comprising a replication manager to propagate the second junction to the second replicated instance of the source storage volume at the split path on the second replicated instance of the source storage volume and to replicate a deletion of each file in the split path on the second replicated instance of the second replicated instance of the source storage volume.

19. An article, comprising a storage medium, said storage medium having stored thereon instructions, that, when executed by a machine, result in:
    assigning to a first replicated instance of a source volume a first distributed file system globally unique identifier (DFS GUID);

inserting at a split directory of a second replicated instance of the source volume a first junction pointing to the first DFS GUID;
verifying each file in a split path on the second replicated instance of the source volume is closed including verifying each file in the split path on the second replicated instance of the source volume is not being currently accessed by a user;
notifying a volume manager that each file in the split path on the second replicated instance of the source volume is closed;
copying each file in the split path on the first replicated instance of the source volume to a target volume responsive to the notifying that each file in the split path on the second replicated instance of the source volume is closed;
assigning to the target volume a second DFS GUID;
inserting at the split directory on the first replicated instance of the source volume a second junction pointing to the second DFS GUID;
deleting each file in the split path on the first replicated instance of the source volume;
removing from the second replicated instance of the source volume the first junction pointing to the first DFS GUID assigned to the first replicated instance of the source volume; and
updating the second replicated instance of the source volume.

20. The article according to claim 19, wherein updating the second replicated instance of the source volume the move of the files in the split path from the first replicated instance of the source volume to the target volume includes:
inserting at the split directory on the second replicated instance of the source volume a copy of the second junction to the second DFS GUID pointing to the target volume; and
deleting each file in the split directory on the second replicated instance of the source volume.

21. The article according to claim 19, wherein:
assigning to the first replicated instance of the source volume a first DFS GUID includes storing an assignment of the first DFS GUID to the first replicated instance of the source volume in a volume locator database (VLDB); and
assigning to the target volume a second DFS GUID includes storing an assignment of the second DFS GUID to the target volume in the VLDB.

22. The article according to claim 19 further comprising un-assigning the first DFS GUID from the first replicated instance of the source volume.

23. The article according to claim 22, wherein un-assigning the first DFS GUID from the first replicated instance of the source volume includes removing an assignment of the first DFS GUID to the first replicated instance of the source volume in a volume location database (VLDB).

* * * * *